Feb. 21, 1961 J. R. ANDERSON 2,972,734

ELECTRICAL CIRCUITS EMPLOYING FERROELECTRIC CONDENSERS

Filed June 23, 1955

INVENTOR
J. R. ANDERSON
BY [signature]
ATTORNEY

United States Patent Office 2,972,734

Patented Feb. 21, 1961

2,972,734

ELECTRICAL CIRCUITS EMPLOYING FERRO-ELECTRIC CONDENSERS

John R. Anderson, Berkeley Heights, N.J., assignor to Bell Telephone Laboratories, Incorporated, New York, N.Y., a corporation of New York Filed June 23, 1955, Ser. No. 517,530

12 Claims. (Cl. 340—173.2)

This invention relates to electrical circuits for the storage of information and, more particularly, to such circuits utilizing ferroelectric elements.

As disclosed in my application Serial No. 254,245, filed November 1, 1951, now Patent 2,717,372, issued September 6, 1955, ferroelectric substances, such as barium titanate, when subjected to an electric field, exhibit a relationship between electric field intensity and polarization of the general form of the hysteresis loop exhibited by ferromagnetic materials. By utilizing the ferroelectric material as a dielectric of a condenser, this hysteresis loop can be used for storage and read-out of information. Generally, as described in the above-mentioned application, the ferroelectric material is polarized in one direction initially; information is then stored by applying voltages to the electrodes of the condenser to reverse this polarization. The stored information is read out by applying voltages to the electrodes to restore the initial polarization.

A single crystal of ferroelectric material may be utilized to provide the dielectric for a large number of condensers; these condensers may be provided with common electrodes as disclosed in my application Serial No. 261,665, filed December 14, 1951, now Patent 2,717,373, issued September 6, 1955. These condensers may be arranged in a storage matrix and a particular condenser of the matrix chosen for storage of information by having a voltage of one polarity applied to the common electrode on one side of this condenser and a voltage of the opposite polarity applied to the common electrode on the other side of the condenser. A third voltage may then be applied across the condensers of sufficient voltage and proper polarity to cause a return to the initial state of polarization of any ferroelectric material whose polarization has been reversed thereby providing an output pulse indicating the stored information.

In digital computers, matrices may store large quantities or bits of information, which information is to be stored and read out at high speeds. As the size of the ferroelectric condensers is decreased to increase the storage capacity of the matrix and switching pulses having faster rise time are applied, by utilizing presently known techniques, the ferroelectric storage matrices are less adapted to meet these requirements. When switching pulses having a very fast rise time, for example less than one-tenth of a microsecond, are employed, the dielectric does not follow the same hysteresis loop as that which it follows on the application of lower frequencies because the dipoles cannot switch instantaneously with the applied voltage; therefore, only the normal displacement charge characteristic of a capacitor can flow during the initial interval. After this initial interval, the output pulse is increased due to the dipoles switching. When the applied voltage is removed, the polarization of the ferroelectric follows the hysteresis loop from the unstable point of saturation to the stable state of remanent polarization and again a small instantaneous change in charge, similar to the displacement charge when voltage is removed from a capacitor, is delivered to the output.

The equivalent circuit of ferroelectric condensers known in the art can be considered to include a capacitance, which we shall designate as $C_0$ and which is the small signal capacitance of the ferroelectric, shunted by a series circuit including a switching resistance $R_s$, a source of voltage $V_{c0}$ and a switch $S_1$. Switch $S_1$ of the equivalent circuit closes only when the applied voltage is opposite in polarity to the last voltage applied, that is, when the applied voltage is in a direction to reverse the electrical dipoles. The switch remains closed only during the switching time and then reopens. The capacitance $C_0$ is always in the equivalent circuit and it determines the magnitude of the output pulse for a stored binary "0." The switching resistance $R_s$ is determined by the slope of the peak switching current versus the applied voltage characteristic and in turn determines the magnitude of the output pulse indicative of a binary "1." Source of voltage $V_{c0}$ can be considered to serve as a threshold for the switch $S_1$ as this value of voltage must be overcome by the applied pulse before $S_1$ closes and the dipoles are switched.

The limiting factor in the usable size of the ferroelectric condenser is the signal-to-noise ratio of the output signals. For the purpose of this discussion, the signal-to-noise ratio may be defined as the ratio of the output signal from a ferroelectric condenser, when a digit or a "1" had been stored, to the output signal from that condenser when no digit or a "0" had been stored.

As electrode areas are decreased below about 200 square mils on ferroelectric crystals, it has been found that the switching resistance $R_s$ decreases linearly with area, whereas $C_0$ shows only a very slight decrease due to the fringing effects of the electrodes upon the dielectric. Therefore, although the binary "1" outputs decrease proportionally as electrode size is decreased, the binary "0" outputs show a relatively small decrease; this causes a marked reduction in the signal-to-noise ratio. A similar situation also occurs in large matrices of ferroelectric cells when a single cell is selected. The small signal capacitances of many other unselected cells appear as an additional capacitance shunting the selected cell in the array and may be considered to increase capacitance $C_0$ of the equivalent circuit. This tends further to reduce the signal-to-noise ratio.

It is a general object of this invention to provide improved storage or memory circuits utilizing ferroelectric condensers.

It is another object of this invention to increase the signal-to-noise ratio of ferroelectric storage circuits.

It is still another object of this invention to reduce the size of individual ferroelectric storage condensers and increase the number of such condensers that may be employed in ferroelectric storage matrices.

A further object of this invention is to provide an improved ferroelectric shift register circuit.

When a "0" has been stored in a ferroelectric condenser, the output signal is a spike of very short duration. When a "1" has been stored in the ferroelectric condenser, the output pulse has an initial portion of approximately the same magnitude as the output spike; however, before the pulse can substantially decrease in amplitude, it increases in magnitude due to the reversal of the polarization of the ferroelectric material defining the dielectric of the condenser. Accordingly, where the spike appearing at the output is of very short duration having its maximum amplitude immediately on application of the read-out or sensing pulse to the ferroelectric condenser, the output pulse, when the state of polarization of the ferroelectric is switched, is a comparatively long pulse having its maximum amplitude considerably after the application of the sensing or read-out pulse to the ferroelectric condenser.

In accordance with one aspect of this invention, the signal-to-noise ratio of a ferroelectric condenser is increased by applying to the output of the ferroelectric condenser a cancellation pulse coincident with the sensing pulse applied directly to the ferroelectric condenser. The cancellation pulse is of the same shape and magnitude but of opposite polarity to the output spike appearing at the output terminal when a "0" had been stored in the ferroelectric condenser and the sensing pulse is applied. Advantageously, the output spike for a stored "0" and the cancellation pulse are both directly applied to a common load or output resistance so that equal and opposite currents flow through the load and no pulse appears at the output terminal. However, by making the cancellation pulse always slightly larger than the output due to the sensing pulse when a "0" has been stored, a small "0" signal will be derived at the output terminal of opposite polarity to the output pulse for a stored binary "1" further increasing the signal-to-noise ratio.

As the cancellation pulse is applied to the output resistor or load on each application of the sensing pulse to the ferroelectric condenser, it will also be applied when a binary "1" has been stored and a true output pulse derived from the ferroelectric condenser. However, as the cancellation pulse is of very short duration and the output pulse maximum occurs after cessation of the cancellation pulse, the cancellation pulse will have only a negligible effect upon the output pulse for a stored "1."

The cancellation pulse may advantageously be applied to the output or load resistor simultaneously with the output pulse or spike from the ferroelectric condenser, in accordance with this invention, through a capacitor connected to the load resistor, a square wave compensating pulse similar to the sensing pulse and coincident therewith, but of opposite polarity, being applied to the capacitor while the sensing pulse is applied to the ferroelectric condenser. The compensating capacitor advantageously, in specific embodiments of this invention, has a capacitance of approximately the same magnitude as the normal small signal capacitance $C_0$, discussed above, if a single ferroelectric condenser only is being utilized, or of approximately the same magnitude as the normal small signal capacitance $C_0$ plus any external circuit capacitance shunting the ferroelectric condenser, as when the condenser being sensed is included in a ferroelectric storage matrix.

In this manner and in accordance with this invention, the compensating capacitor and the output resistor comprise a differentiating circuit having the same characteristic as the ferroelectric condenser and the output resistor when a binary "0" is stored therein. In certain embodiments of this invention usual capacitors, known in the art, may be employed as the compensating capacitors. In other specific embodiments of this invention, however, a ferroelectric condenser may itself be employed as the compensating capacitor, a sensing pulse being applied across the compensating condenser simultaneously with that to the storage condenser, but of opposite polarity.

If a second ferroelectric condenser is employed, information is never stored therein so that the output pulse therefrom on application of the sensing pulse is a short spike indicative of a stored "0" in a storage condenser. However, the output spike from the compensating ferroelectric condenser is opposite in polarity to that from the storage ferroelectric condenser and defines the cancellation pulse discussed above.

It is advantageous in those embodiments of this invention wherein the cancellation pulse is attained from a compensating ferroelectric condenser connected, together with the storage condenser, to the output resistor that the characteristics of the compensating and storage ferroelectric condensers be similar. This may be readily attained in certain specific embodiments in accordance with aspects of this invention wherein the storage and compensating ferroelectric condensers have a common ferroelectric member or slab as the dielectrics thereof. In these illustrative embodiments, the two condensers advantageously have one electrode in common on one side of a slab of ferroelectric material, to which electrode the output resistor and terminal are connected, and distinct electrodes on the other side of the slab of ferroelectric material, to which distinct electrodes the sensing and compensating pulses are applied.

A ferroelectric storage matrix in accordance with this invention may advantageously have one row or column of the ferroelectric condensers define the compensating ferroelectric condensers. If the output circuits are connected to the column electrodes, one row electrode may have applied thereto only the compensating pulse. Thus, compensation is provided for all the storage cells or condensers in the matrix by applying a compensating pulse to this one row electrode simultaneously with the sensing pulse applied to any of the other row electrodes of the matrix.

The principles of this invention may also be employed in ferroelectric shift register circuits. Advantageously, compensating pulses may be applied to each stage of the shift register and thus insure that no false domain reversals occur in the ferroelectric condensers. These compensating pulses may be applied to first alternate stages of the shift register simultaneously with the application of and opposite in polarity to the shift pulses applied to second alternate stages of the shift register. Similarly, when shift pulses are applied to first alternate stages of the shift register, compensating pulses of opposite polarity are applied to second alternate stages. Also, compensating pulses are applied to the output load through a separate condenser simultaneously with and of opposite polarity to the shift pulses applied to the last stage.

If, however, the output signal is derived from a single ferroelectric condenser connected to a resistive load, only one compensating condenser is required. This condenser may advantageously be connected to the load. Here again compensating pulses of opposite polarity are applied to the compensating condenser simultaneously with the sensing pulses applied to the ferroelectric condenser.

Accordingly, in specific illustrative embodiments of this invention, a ferroelectric condenser is connected to an output impedance and a compensating condenser is connected at the intermediate point between the ferroelectric condenser and the impedance. Storage pulses are applied across the ferroelectric condenser and the impedance as are the sensing pulses. Simultaneously with the application of the sensing pulse, a pulse of opposite polarity is applied through the compensating condenser. If a binary digit is stored, the compensating pulse has only a slight effect upon the resulting output pulse. However, if a binary "0" is stored, the compensating pulse effectively cancels or even drives the binary "0" in an opposite polarity to that of the stored digit. This compensating condenser may also be a ferroelectric condenser and it may advantageously be a ferroelectric condenser having one electrode in common with the storage electrode.

In storage matrices incorporating compensating capacitances in accordance with this invention, the number of storage condensers obtainable in a matrix of a given area may be increased by a factor of 2 with an increase in the signal-to-noise ratio of this matrix.

It is a feature of this invention that a cancellation pulse be applied to the output resistor or impedance of a ferroelectric condenser simultaneously with the application of the sensing pulse to the ferroelectric condenser and of such a magnitude and polarity as to cancel, substantially, completely, or excessively, the output spike from a ferroelectric condenser, the state of polarization of which has not been switched by the applied sensing pulse.

It is a further feature of this invention that a compensating condenser be connected to the intermediate point between a ferroelectric condenser and the output impedance therefor, the capacitance of the compensating condenser being substantially the small signal capacitance of the ferroelectric condenser. Further, in accordance with this feature of this invention, a compensating pulse is applied to the compensating condenser coincident with and of the same magnitude as the sensing pulse applied to the ferroelectric condenser, but of opposite polarity thereto.

It is another feature of certain embodiments of this invention that the compensating condenser be itself a ferroelectric condenser, the compensating pulse applied thereto being such that the state of polarization of the compensating ferroelectric condenser is never switched.

It is still another feature of this invention that the compensating and storage condensers may utilize a common slab of a ferroelectric material for the dielectrics thereof. Further, it is a feature of this invention that the compensating and storage condensers thus defined may have a common electrode.

It is still a further feature of this invention to employ one row of ferroelectric condensers in a storage matrix, defined on a single slab of a ferroelectric material, as compensating capacitors for all the other condensers of the matrix, a compensating pulse being applied to this one row whenever a condenser in the matrix or another row of condensers is being sensed.

It is a further feature of this invention to employ compensating capacitors connected to each of the shift pulse buses of a ferroelectric shift register as well as to the output load and to apply compensating pulses to each of these capacitors when a shift pulse is applied to the adjacent stage to achieve an output exhibiting an increased signal-to-noise ratio.

A complete understanding of this invention and of these and other features may be gained from consideration of the following detailed description and the accompanying drawing in which.

Figure 1:
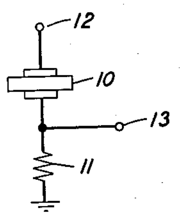
Fig. 1 is a schematic representation of a ferroelectric storage circuit including a resistive load in accordance with the prior art.
Figures 2A, 2B, 2C, 2D, 2E:
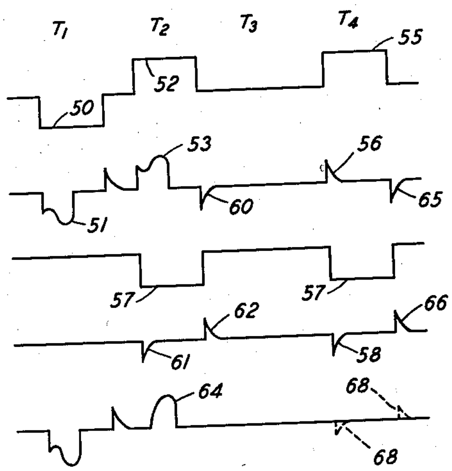
Figs. 2A and 2B are time plots of various voltages in the storage and read-out cycle of the device depicted in Fig. 1.
Figs. 2C, 2D and 2E are time plots of various voltages in the storage and read-out cycles of devices in accordance with embodiments of this invention.

Turning now to the drawing, Fig. 1 depicts a ferroelectric storage circuit employing a resistive load of the type well known in the art and described in my application Serial No. 254,245, filed November 1, 1951, now Patent 2,717,372. A condenser 10, having a ferroelectric material as its dielectric, is connected to ground through resistor 11. For the purpose of explanation, we will assume that the dielectric, which exhibits a substantially rectangular hysteresis loop, has its domains normally polarized in a negative direction in the "0" stored state so that a binary "1" is stored in the condenser by applying a negative pulse 50 between input terminal 12 and ground. This pulse 50 is represented in the time plot of Fig. 2A as being applied during the storage interval $T_1$. When pulse 50 is applied to input terminal 12 to store a binary "1," a pulse 51 appears at the output terminal 13, as shown in Fig. 2B; pulse 51 is negative. The stored information or binary digit may now be read out of ferroelectric condenser 10 by the application of a positive pulse 52 between terminal 12 and ground as indicated in Fig. 2A during the sensing interval $T_2$. The positive output pulse 53 derived at terminal 13 during the interval $T_2$ is depicted in Fig. 2B. Since the sensing pulse 52 has reversed the domain of the ferroelectric condenser, this condenser is in its "0" state and, in the absence of a negative store or write pulse during time $T_3$, subsequent positive sensing pulses, such as pulse 55 during interval $T_4$, do not reverse the domains. However, a small positive voltage spike 56 appears at the output terminal 13 at the beginning of the interval $T_4$. As the spikes, such as spike 56, are of the same polarity as the output pulses, such as pulse 53, they may represent erroneous output information to subsequent circuitry which would have to distinguish between the output pulse 53, when a "1" had been stored, and the output pulse or spike 56, when a "0" had been stored in the ferroelectric condenser.

These spikes 56 are produced at the output terminal 13 as a result of differentiating the square wave input pulse 55 by means of the differentiating circuit comprising the resistor 11 and ferroelectric condenser 10 and specifically the small signal capacitance $C_0$ thereof, as discussed above. The ratio of the signal 53 derived from a stored digit, indicated at $T_2$ of Fig. 2, to these spikes 56, during sensing interval $T_4$, determines the signal-to-noise ratio; this ratio is improved in accordance with aspects of this invention by decreasing or even eliminating these spikes without producing any deleterious effect on the signal indicating the stored digit.

Figure 3:
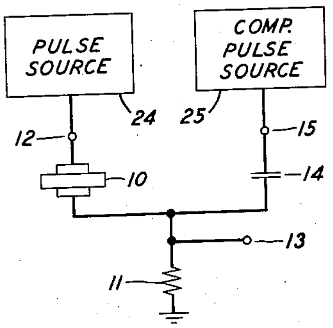
Fig. 3 is a schematic representation of one illustrative embodiment of this invention.

Referring now to Fig. 3, which depicts one illustrative embodiment of this invention, a compensating condenser 14 is connected between a terminal 15 and a point intermediate ferroelectric condenser 10 and the output load resistor 11. Condenser 14 and resistor 11 also comprise a differentiating circuit. Assuming no digit is stored in condenser 10 and a compensating pulse 57, Fig. 2C, opposite in polarity to the sensing pulse 55, is applied to terminal 15 from a compensating pulse source 25 at the same time that a sensing pulse 55 is applied to terminal 12 from a sensing pulse source 24, each of the two differentiating circuits will produce a pair of spikes 56 and 58, Figs. 2B and 2C, respectively, opposite in polarity to each other and thus the effect of the differentiation will be cancelled at the output terminal 13, as indicated in Fig. 2E. Figs. 2A through 2E accordingly are plots of the voltages appearing at various points in the circuit of Fig. 3 at various times during the operation of this specific illustrative embodiment of the invention. Fig. 2A is a plot of the voltages applied to the input terminal 12 for storage and sensing of the information in the ferroelectric condenser 10. At time $T_1$ a "1" is stored in the condenser; at time $T_2$ this information is sensed or read out. At time $T_3$ a "0" is stored in the condenser; at time $T_4$ this information is read out. Fig. 2B is a time plot of the voltages appearing at the output terminal 13 due to the condenser 10 alone, as discussed above with reference to the prior art circuit of Fig. 1. Fig. 2C is a time plot of the compensating voltage pulses applied to terminal 15, in accordance with an aspect of this invention. Fig. 2D is a time plot of the voltages appearing at the output terminal 13 due to the compensating condenser 14 alone. And Fig. 2E is a time plot of the actual output voltages appearing at the output terminal 15 in accordance with this embodiment of the invention.

If a binary digit or bit of information is stored in condenser 10, as by applying a storage pulse 50, Fig. 2A, from source 24 or other pulse source, a subsequent positive pulse 52, Fig. 2A, applied between terminal 12 and ground senses the stored bit of information. Simultaneously with the application of this sensing pulse, a negative or compensating pulse 57 is applied between terminal 15 and ground. The differentiating circuit including ferroelectric condenser 10 and resistor 11 will produce a positive pulse 53 and a negative pulse 60, Fig. 2B, in that order while the differentiating circuit including condenser 14 and resistor 11 produces a negative spike 61 and a positive spike 62 in that order. The ultimate effect is that these spikes effectively cancel each other and the output signal 64, Fig. 2E, indicating a stored bit of information is decreased only slightly at its leading edge. If, on the other hand, there is no stored information in ferroelectric condenser 10, the application of the positive sensing pulse 55 between terminal 12 and ground will merely produce a positive spike 56 and a negative spike 65 while the simultaneous application of the negative compensating pulse 57 to terminal 15 will produce a negative spike 58 and a positive spike 66 in that order. Advantageously, the magnitude of the compensating pulse 57 applied to terminal 15 may be the same as that of the sensing pulse 55 applied to terminal 12 in which case the various spikes effectively cancel each other. Alternatively, the compensating pulses may be slightly larger. Under these conditions, the spikes resulting from the input pulse at terminal 12 will be cancelled and even driven in the opposite direction and outputs will be derived as indicated by the dashed pulse 68 in Fig. 2E. Thus, it is seen that the signal-to-noise ratio is greatly increased as this ratio is now the ratio of the positive output pulse 64 to the negative pulse 68.

Figure 4:
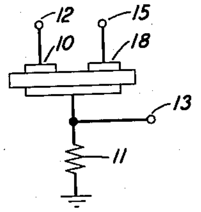
Fig. 4 is a schematic representation of another illustrative embodiment of this invention.

Referring now to Fig. 4, an embodiment is depicted in which condensers 10 and 18 have a common electrode connected to output resistor 11. Advantageously, each of condensers 10 and 18 is a ferroelectric condenser and may be formed upon a single ferroelectric crystal such as barium titanate or guanidinium aluminum sulphate hexahydrate. The operation of this circuit is basically the same as that of Fig. 3. As only compensating pulses of one polarity are applied to the compensating ferroelectric condenser 18, its state of polarization and domains are never reversed. Accordingly, this condenser acts as a capacitor having a capacitance equal to the small signal capacitance $C_0$ of the condenser, as discussed above. Because the ferroelectric storage condenser 10 and the ferroelectric compensating condenser 18 advantageously are formed on a single slab of ferroelectric material, with a common electrode, their electrical characteristics will be substantially identical so that the effective capacitance of the compensating condenser 18 should be equal to the small signal capacitance of the storage condenser. Accordingly, by applying sensing and compensating pulses of equal magnitudes but opposite polarity, substantially complete cancellation of the spurious voltage spikes at the output terminal may be attained. However, if the small signal capacitance of the storage condenser is augmented by additional capacitances in parallel, as of nonselected condensers in a matrix, then for exact cancellation to occur the compensating pulses 57 should be slightly larger than the sensing pulses 52 and 55.

Figure 5:
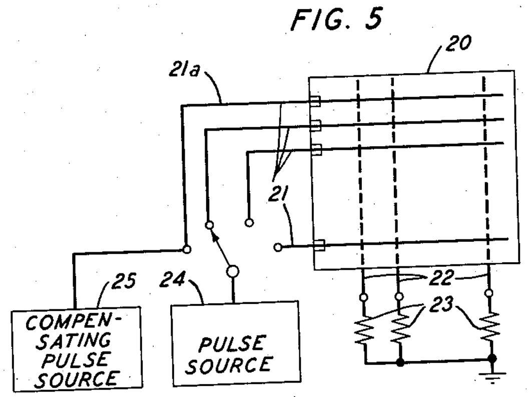
Fig. 5 is a schematic representation of a ferroelectric storage matrix illustrative of another specific embodiment of this invention.

In Fig. 5 a ferroelectric matrix is depicted in which a single ferroelectric crystal 20 has a plurality of row electrodes 21 deposited or otherwise placed on one surface and a plurality of column electrodes 22 placed on the opposite surface of the crystal, such as depicted and described in my application Serial No. 261,665, filed December 14, 1951, now Patent 2,717,373. As therein described, a ferroelectric condenser is established between the intersections of each row and column electrode.

In accordance with this invention, the compensating pulse source 25 is connected to row electrode 21*a* and a source of store and sensing pulses 24 may be selectively connected to any one of row electrodes 21. Output load resistors 23 are connected to each of column electrodes 22. Storage and sensing pulses are applied from pulse source 24 to selected ones of the row electrodes 21. Compensating pulses are applied from pulse source 25 to row electrode 21*a* simultaneously with the application of these sensing pulses. The ferroelectric condensers between the electrode 21*a* and each of the column electrodes 22 effectively act as compensating capacitors of the type illustrated as 18 in Fig. 4.

Figure 6:
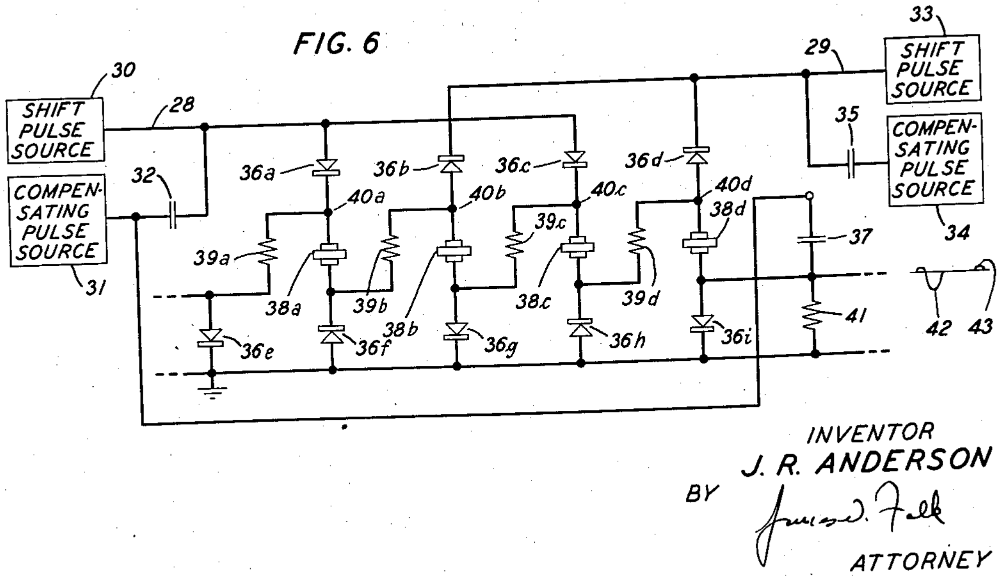
Fig. 6 is a schematic representation of a shift register circuit illustrative of another specific embodiment of this invention.

Fig. 6 depicts a shift register broadly of the type depicted and described in my application Serial No. 254,245, filed November 1, 1951, now Patent 2,717,372. In the shift register depicted in Fig. 6, alternate ferroelectric condensers 38 are connected through oppositely poled diodes 36 or other unidirectional current elements, to positive and negative shift buses 28 and 29, respectively, and also, through a second group of diodes 36, to ground. The stages of the shift register are coupled together through resistors 39. In accordance with this invention, a compensating condenser 32 is connected between a source 31 of compensating pulses and the shift bus 28 and a second compensating condenser 35 is connected between a source 34 of compensating pulses and the other shift bus 29. A compensating condenser 37 is connected between output load resistor 41 and compensating pulse source 31. Any number of stages may be added and similarly compensated, it being understood that the compensating condenser 37 for the output load is connected to the source of compensating pulses opposite the shift pulse source connected to the last stage. Source 30 applies shift pulses to first alternate stages of the shift register while source 33 applies shift pulses to second alternate stages.

Simultaneously with the application of positive shift pulses from source 30, negative compensating pulses are applied from source 34. The shift pulse from source 30 passes through diodes 36*a* and 36*c* and effectively senses the polarization of ferroelectric condensers 38*a* and 38*c*. The resulting pulses from condensers 38*a* and 38*c* now pass through resistors 39*b* and 39*d* and appear at terminals 40*b* and 40*d* as a positive and a negative spike, assuming the state of polarization of condensers 38*a* and 38*c* is not to be changed by the shift pulse. The compensating pulses from source 34 pass through condenser 35 and diodes 36*b* and 36*d* and appear at terminal 40*b* and 40*d* as spikes of negative and positive polarity, respectively. To these two voltages applied to terminal 40*b* and 40*d*, ferroelectric condensers 38*b* and 38*d* present effective resistive loads and thus perform the same function with regard to the differentiating circuit as resistor 11 in Fig. 3. Similarly, condensers 38*a* and 38*c* perform the same function as condenser 10 of Fig. 3 while condenser 35 performs the function similar to that of condenser 14 in Fig. 3. Thus, the voltage applied to 38*b* will, in the absence of any stored information on condenser 38*a*, be nearly zero or, if not zero, a slightly negative pulse by the amount that the compensating pulses from source 34 exceed the value of the shift pulses applied from source 30. Pulses are applied from souces 30 and 34 simultaneously as are pulses from sources 31 and 33. Since these shift and compensating pulses are effectively applied to first and second alternate stages, respectively, a similar cancellation takes place at each stage of the shift register in accordance with a feature of this invention.

Assume now for the purposes of explanation of the operation of this embodiment of the invention that a binary "1" is stored on condenser **38*d*; this binary "1" may be transferred to the output load resistor 41 by the application of a negative shift pulse from source 33. Under these conditions, a pulse is developed through load resistor 41 through condenser 38*d* and diode 36*d*. At the same time that this negative shift pulse is applied from source 33, a positive compensating pulse is applied from source 31 through the compensating condenser 37. Condenser 37 and resistor 41 comprise a differentiating circuit as does condenser 38*d* and resistor 41. Again pairs of pulses will be produced in response to the square wave shift and compensating pulses, respectively, which will be of opposite polarity. The negative spike from condenser 37 will cancel the leading edge of the output pulse due to condenser 38*d*, and a negative pulse 42 will appear across the resistor 41 to indicate the stored binary "1." If, however, no binary digit had been stored in condenser 38*d*, the shift pulse and the compensating pulse would have produced pairs of spikes at the output terminal which would have cancelled each other or have delivered a slightly positive pulse such as, for example, pulse 43** which would be positive by the amount that the compensating pulse exceeded the shift pulse.

While specific embodiments of ths invention have been described above with reference to shift register circuits, to matrices and to single bit ferroelectric storage circuits, it is evident that the principles of this invention may be applied to any other circuit employing ferroelectric storage condensers to increase the signal-to-noise ratio. Thus, it is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a condenser having a dielectric of ferroelectric material, means for applying storage and sensing pulses to said condenser, output means including a load impedance connected to said condenser, and differentiating means including said load impedance for applying a cancelling pulse to said output means of a polarity to oppose the output of said condenser on application of a sensing pulse to said condenser.

2. An electrical circuit comprising a first condenser having a dielectric of a ferroelectric material, means for applying storage and sensing pulses to said first condenser, and means for increasing the signal-to-noise ratio of said first condenser, said last-mentioned means including a second condenser connected to one side of said first condenser and means applying a compensating pulse to said second condenser of a polarity to oppose the output of said first condenser on application of a sensing pulse to said first condenser.

3. An electrical circuit comprising a first condenser having a dielectric of a ferroelectric material, an output impedance connected to said first condenser, a second condenser connected to said output impedance, means for applying storage and sensing pulses to said first condenser, and means for applying compensating pulses to said second condenser simultaneously with said sensing pulses and of opposite polarity thereto.

4. An electrical circuit in accordance with claim 3 wherein said second condenser also has a dielectric of a ferroelectric material.

5. An electrical circuit comprising a ferroelectric member, a pair of electrodes on said member and defining a first condenser, another electrode on said member and defining with one of said first pair of electrodes a second condenser, an output impedance connected to the common electrode of said two condensers, means for applying storage and sensing pulses to said first condenser, and means for applying compensating pulses to said second condenser simultaneous to said sensing pulses and of opposite polarity thereto.

6. An electrical circuit comprising a first condenser having a dielectric of a ferroelectric material, means for applying storage and sensing pulses to said first condenser, an output impedance connected to said first condenser, a second condenser connected to said output impedance, the capacitance of said second condenser being substantially equal to the small signal capacitance of said first condenser, and means for applying compensating pulses to said second condenser simultaneously with said sensing pulses and of opposite polarity thereto, said sensing and compensating pulses being of substantially the same order of magnitude.

7. An electrical circuit comprising a slab of ferroelectric material having rows of electrodes on one surfaces and columns of electrodes on the opposite surface, means connected to said row electrodes for applying storing and sensing pulses thereto, output means connected to said column electrodes, and means for increasing the signal-to-noise ratio of said circuit, said last-mentioned means including one of said row electrodes, and means for applying a compensating pulse opposite in polarity to said sensing pulse and coincident therewith to said one row electrode.

8. An electrical circuit comprising a matrix of ferroelectric condensers having rows and columns of electrodes, means for selectively applying storage and sensing pulses to selected ones of said row electrodes, output means connected to said column electrodes, compensating condensers connected to said output means, and a pulse source connected to said compensating condeners for applying compensation pulses thereto coincident with said sensing pulses and opposite in polarity thereto.

9. An electrical circuit comprising a first differentiating circuit including a ferroelectric condenser and a resistor connected in series, means for applying storage and sensing pulses to said ferroelectric condenser, a second differentiating circuit including a condenser and said resistor, and means for applying compensating pulses to said second differentiating circuit concurrently with the application of said sensing pulses to said ferroelectric condenser.

10. A device for registering coded information, comprising a first capacitor having a dielectric of high remanence and having two possible conditions of remanence, a second capacitor, a difference-signal impedance member coupled to an electrode of each of said capacitors, means for applying electrical pulses simultaneously in parallel to the remaining electrodes of said capacitors whereby a difference signal produced in said impedance member in response to said pulses has a value of zero if said first capacitor is in one of said conditions of remanence and has a finite value if said first capacitor is in the other of said conditions of remanence, and means connected to said impedance member to derive said difference signal therefrom.

11. A device for registering coded information, comprising a first capacitor having a dielectric of high remanence and having two possible conditions of remanence, a second capacitor, a difference-signal impedance member coupled to an electrode of each of said capacitors, means for applying electrical pulses simultaneously in parallel to the remaining electrodes of said capacitors whereby a difference signal produced in said impedance member in response to said pulses has a value of zero if said first capacitor is in one of said conditions of remanence and has a finite value if said first capacitor is in the other of said conditions of remanence, means connected to said impedance member to derive said difference signal therefrom, and said impedance member comprising a resistor, an end of said resistor being connected jointly to the first-named electrodes of said capacitors.

12. A device for registering coded information, comprising a first capacitor having a dielectric of high remanence and having two possible conditions of remanence, a second capacitor, a difference-signal impedance member coupled to an electrode of each of said capacitors, means for applying electrical pulses simultaneously in parallel to the remaining electrodes of said capacitors whereby a difference signal produced in said impedance member in response to said pulses has an absolute value which is substantially less than the signal contributed by said first capacitor if said first capacitor is in one of said conditions of remanence and has a significantly greater finite value if said first capacitor is in the other of said conditions of remanence, and means connected to said impedance member to derive said difference signal therefrom.

References Cited in the file of this patent

UNITED STATES PATENTS

| | | |
|---|---|---|
| 2,717,372 | Anderson | Sept. 6, 1955 |
| 2,919,063 | Young | Dec. 29, 1959 |

FOREIGN PATENTS

| | | |
|---|---|---|
| 162,314 | Australia | July 1, 1954 |